United States Patent [19]  
Belov et al.

[11] 3,879,485  
[45] Apr. 22, 1975

[54] METHOD OF PRODUCING BUTENE-1

[76] Inventors: Gennady Petrovich Belov, p/o Chernogolovk, ulitsa Pervaya, 5, kv. 15; Taimuraz Savelievich Dzhabiev, p/o Chernogolovka, ulitsa Pervaya, 31, kv. 41; Fridrikh Stepanovich Dyachkovsky, p/o Chernogolovka, ulitsa Tretya, 3, kv. 2; Vyacheslav Ivanovich Smirnov, p/o Chernogolovka, ulitsa Tretya, 1, kv. 19; Nelli Dzhavkharovna Karpova, p/o Chernogolovka, ulitsa Pervaya, 29, kv. 100; Khaim-Mordkhe Aronovich Brikenshtein, p/o Chernogolovka, ulitsa Vtoraya, 5, kv. 1; Matrena Petrovna Gerasina, p/o Chernogolonka, ulitsa Pervaya, 2a, kv. 61, all of Moskovskaya oblast, Noginsky raion; Vladimir Evgenievich Kuzmin, ulitsa 50 letiya Oktyabrya, 13/12 kv. 199, Kazan; Petr Evgenievich Matkovsky, p/o Chernogolovka, ulitsa Pervaga, 16, kv. 26, Moskovskaya oblast, Noginsky raion; Ljudmila Nikolaevna Russiyan, p/o Chernogolovka, ulitsa Pervaya, 2a, kv. 41, Moskovskaya oblast, Norginsky raion; Anatoly Dmitrievich Pomogailo, p/o Chernogolovka, ulitsa Pervaga, 33, kv. 15, Moskovskaya oblast, Noginsky raion, all of U.S.S.R.; Nikolai Mikhailovich Chirkov, deceased, late of ulitsa Vavilova, 55/5, kv. 6, Moscow, U.S.S.R., Mikhail Nikolaevish Chirkov, administrator

[22] Filed: Jan. 25, 1974

[21] Appl. No.: 436,809

[52] U.S. Cl. .................... 260/683.15 D; 252/431 R  
[51] Int. Cl. ............................................... C07c 3/10  
[58] Field of Search ........................... 260/683.15 D

[56] References Cited  
UNITED STATES PATENTS  
2,943,125   6/1960   Ziegler et al.................. 260/683.15  
3,686,350   8/1972   Ono et al....................... 260/683.15

*Primary Examiner*—Paul M. Coughlan, Jr.  
*Attorney, Agent, or Firm*—Holman & Stern

[57] ABSTRACT

Butene-1 is prepared by dimerizing ethylene in the presence of a complex organometallic catalyst of the formula $(RO)_3TiR' \cdot AlR_2''OR + AlR_2''R'$, where R is an alkyl radical with the number of carbon atoms from 2 to 4, $R' = R$ or H, $R''$ is the same as R, or of a catalyst of the formula $Ti(OR)_4 + AlR_2''R'$ and modifiers such as $(C_5H_5)_2TiCl_2$, oxygen, metaphenylenediamine or N-phenyl-β-napthylamine, in the medium of solvents such as n-heptane, n-decane, toluene, diethyl ether, ethyl chloride, vinylbutyl ether, tetrahydrofuran, diphenyl ether, methylphenyl ether and their mixtures.

1 Claim, No Drawings

METHOD OF PRODUCING BUTENE-1

The present invention relates to the field of producing unsaturated hydrocarbons, and more particularly to methods of producing butene-1.

Butene-1 can be used in the production of n-butyl alcohol, copolymers of ethylene with butylene, isotactic polybutene, butylene oligomers, as well as in the production of butadiene and other products of petrochemical processing.

Several methods of producing butene-1 are known in the art: separation of butene-1 from the butane-butylene fraction of cracked gases, dehydration of butyl alcohol, dehydrogenation of butane, and thermal or catalytic dimerization of ethylene.

The process of producing butene-1 by dimerizing ethylene on complex organometallic catalysts has gained wide acceptance. In accordance with the known methods, dimerization of ethylene to butene-1 is carried out at temperatures ranging from 0° to 100°C, preferably from 10° to 40°C, the pressure of ethylene being either atmospheric or elevated (up to 40 gauge atmospheres), in the medium of organic solvents (heptane, hexane, benzene, toluene, butane, isooctane, or mixtures of these solvents with butene-1).

In the processes of ethylene dimerization complex catalysts including compounds of nickel, cobalt or titanium are employed.

Catalysts based on nickel or cobalt compounds are noted for their low selectivity.

Reactions of ethylene dimerization run on these catalysts give a complex mixture of products consisting of butene-1, cis-trans-butenes-2, hexenes, octenes, etc. Dimerization of ethylene on catalysts consisting of titanium alkoxides and organoaluminium compounds (Ti(OR)$_4$ + AlR$_3$' or AlR$_2$''H, where R, R', R'' stand for an alkyl, cycloalkyl or aryl hydrocarbon radical) in the medium of hydrocarbon solvents, usually results in the formation, alongside of butene-1, of 0.5 to 5.0 vol. per cent of butenes-2 and from 1.5 to 8.0 weight per cent of polyethylene.

Dimerization of ethylene on catalysts of this type with ethylene pressure of 1 to 10 atm proceeds at a relatively low rate (1 to 2 g/lit per min. with the concentration of Ti(OR)$_4$ of about $5 \cdot 10^{-3}$ mole/lit.). In the course of the process the catalyst rapidly loses its activity, which results in lowering of its capacity, i.e. in a lower yield of butene-1 in moles per mole of Ti(OR)$_4$.

With a view to increasing the activity and capacity of the catalyst, the process of dimerizing ethylene to butene-1 is recommendable to be carried out at low temperatures (ranging from 10° to 40°C), this involving considerable difficulties as regards the problem of heat removal.

Low selectivity of the known processes of dimerizing ethylene to butene-1, low yields of the desired product per unit weight of the catalyst, sophisticated and cumbersome process equipment, all these factors are responsible for the high ultimate cost price of butene-1. This is to a considerable extent associated with the fact that the formation of byproducts, even in small amounts (2 to 5 weight per cent for the reacted ethylene) adversely tells on the entire technological process of producing butene-1, since by-products not only lower the yield of butene-1 and its purity, but also reduce the working time of the process equipment, insofar as solid polymer accumulating in the reactors has to be periodically removed, which can be done only by interrupting the dimerization process and, hence, at the expense of lost time of the equipment.

In some cases, for attaining partial improvement of process characteristics, it was suggested to introduce catalyst modifiers into the reaction mixture in amounts commensurable with the amount of the catalyst components (the molar ratio modifier/Ti(OR)$_4$ being 0.01 to 10; modifier/AlR$_3$ being 0.01 to 1.0).

As modifiers use is made of organic esters of orthophosphoric acid, diphenylamine, phenothiazine, etc.

The inclusion of these compounds into the composition of the catalyst in amounts of 0.1 to 1.0 mole per mole of the taken alkylaluminium leads to a certain reduction in the polymer formation; however, the activity and capacity of the catalyst are also essentially reduced in this case.

Different compounds used as modifiying additives, even if they belong to the same class of compounds, produce different influence on both the rate of dimerization of ethylene to butene-1 and on side reactions of polymerization of ethylene to polyethylene. At present it is hardly possible to establish any definite relationship between the properties of the modifier (its structure, etc.) and the inhibitory effect it produces on the reaction of polymer formation, or its general influence on the process of dimerization of ethylene to butene-1. It is just for this reason that patents teach the application as modifiers of only individual compounds and not of whole classes of compounds.

It is an object of the present invention to increase the catalyst activity.

Another object of the invention is to enhance the selectivity of the process by diminishing polymerization of ethylene to high-molecular polyethylene, as well as to diminish the rate of or preclude the formation of butenes-2 and higher olefines.

Said objects have been accomplished by the provision of a method of producing butene-1, residing in that dimerization of ethylene to butene-1 is carried out, according to the invention, in the presence of a complex organometallic catalyst consisting of titanium alcoholates of the formula (RO)$_3$TiR'·AlR$_2$''OR and alkylaluminium of the formula AlR''$_2$R', where R is an alkyl radical with the number of carbon atoms from 2 to 4, R'=R or H, R'' is the same as R, in the medium of hydrocarbon solvents such as n-heptane, n-decane, toluene.

Titanium alcoholates of the formula (RO)$_3$TiR'·AlR''$_2$OR contain ethoxy-, propoxy-, isopropoxy-, butoxy-, isobutoxygroups linked with titanium and aluminium. As di- and trialkylaluminium of the formula AlR$_2$''R' triethylaluminium, tributylaluminium, triisobutylaluminium, diisobutylaluminium hydride, tripropylaluminium, or triisopropylaluminium is used. Optimal results are obtained with the catalyst of the formula (C$_4$H$_9$O)$_3$Ti C$_2$H$_5$·Al(C$_2$H$_5$)$_2$OC$_4$H$_9$.

Depending on particular conditions, the molar ratio of trialkylaluminium to titanium alcoholate in the catalyst when carrying out dimerization of ethylene to butene-1 is varied within a range of from 1.5 to 100. The concentration of titanium alcoholate in the reaction medium is varied within a range of from $1 \cdot 10^{-2}$ to $1 \cdot 10^{-5}$ mole/lit. Dimerization is effected at temperatures of 0° to 100°C and ethylene pressure of 1 to 40 atm.

Said objects are also accomplished by the provision of a method of producing butene-1, wherein, according to the invention, dimerization of ethylene to butene-1 is carried out in the presence of a complex organometallic catalyst consisting of titanium alcoholates of the formula $Ti(OR)_4$ and alkylaluminium of the formula $AlR_2''R'$, where R is an alkyl radical with the number of carbon atoms from 2 to 4, $R' = R$ or H, $R''$ is the same as R, in the medium of hydrocarbon solvents such as n-heptane, n-decane, toluene, said catalyst being modified by additives selected from the group consisting of dicyclopentadienyltitanium dichloride, oxygen, metaphenylenediamine, N-phenyl-β-naphthylamine.

The process of dimerization of ethylene to butene-1 by the method of the invention can also be effected in the presence of such amines as diethylamine, diisopropylamine, triethylamine, though the yield of butene-1 in this case materially decreases in spite of the fact that the selectivity of the catalyst is enhanced.

The above-mentioned objects are also accomplished by the provision of a method of producing butene-1, residing in that dimerization of ethylene to butene-1 is carried out in the presence of a complex organometallic catalyst consisting of titanium alcoholates of the formula $Ti(OR)_4$ and alkylaluminium of the formula $AlR_2''R'$, where R is an alkyl radical with the number of carbon atoms from 2 to 4, $R'=R$ or H, $R''$ is the same as R, in the medium of solvents such as ethyl chloride, ethers selected from the group consisting of diethyl, vinylbutyl, diphenyl ethers, tetrahydrofuran, a mixture of heptane with ethyl chloride, a mixture of diethyl ether with butene-1, a mixture of diethyl ether with ethyl chloride.

Dimerization of ethylene to butene-1 also takes place in the presence of the above-mentioned catalysts when dimethyl ether, anisole, phenetole, methyl-butyl ether are used as solvents.

Among the above-cited solvents low-boiling ones are preferable for carrying out dimerization of ethylene to butene-1 (e.g. ethyl chloride, diethyl ether), whose boiling point substantially differs from that of butene-1. The use of these solvents facilitates heat removal, isolation of butene-1 and rectification of the solvent.

According to the invention, modifying additives, viz., dicyclopentadienyltitanium dichloride, oxygen, metaphenylenediamine, N-phenyl-β-naphthylamine, are taken in amounts of 0.15 to 2.0 mole per mole of alkylaluminium. The use of dicyclopentadienyltitanium dichloride does not change the phase state of the catalyst, since dicyclopentadienyltitanium dichloride, as well as the other two components of the catalyst, Ti(OR)$_4$ and $AlR_2''R'$, is soluble in the reaction medium and does not form a heterogeneous phase.

Modification of the catalyst $Ti(OR)_4+AlR_2''R'$ by additions of oxygen allows a 10 to 20 percent increase in the yield of butene-1 with a simultaneous enhancement of the process selectivity.

The quantity of oxygen in the reaction vessel is varied within 0.2:1 to 2:1 with regard to the quantity of alkylaluminium present therein.

The yield of butene-1 in the presence of oxygen reaches 342 g per gram of $Ti(OC_4H_9)_4$, whereas the best result in the absence of oxygen is 312 g per gram of $Ti(OR)_4$. The content of higher olefines and polyethylene in the reaction products diminishes from 5.3 to 1.7 weight percent.

Modifiers are introduced into the reaction vessel either prior to feeding the catalyst, or in the course of the dimerization process. Best results are obtained with N-phenyl-β-naphthylamine and metaphenylenediamine. The application of these compounds as additives wholly suppresses the reaction of polymer formation.

In the herein-proposed method of producing butene-1 on the catalyst $(RO)_3TiR'\cdot AlR_2''OR$ the yield of butene-1 per unit weight of the catalyst, as compared with the known method of producing butene-1 (245.6 g per gram of the catalyst) increases by about 25 weight percent and reaches 312 g per gram of the catalyst. Moreover, while in the known method the quantity of by-products is 8.5 to 25.5 weight percent, in the present method this figure does not exceed 5.3 weight per cent. The replacement of the earlier employed titanium alcoholate $(RO)_4Ti$ by the complex alcoholate $(RO)_3\cdot TiR'\cdot AlR_2''OR$ allows an increase in the initial rate of dimerization and an approximately 1.5 times better yield of butene-1 (from 31.1 g/lit. per hour to 45.7 g/lit. per hour).

Modification of the catalyst $Ti(OR)_4+AlR_2''R'$ by the above-mentioned additives allows a 10 to 20 percent increase in the yield of butene-1 with a simultaneous enhancement of the process selectivity.

The employment as the reaction medium of such heteroatom-containing solvents as ethers (diethyl, dimethyl, dibutyl, methylbutyl, diphenyl, divinyl, diallyl ether, tetrahydrofuran) allows an almost ten-fold increase in the dimerization rate, a raise in the yield of butene-1 to 2-3 kg per gram of titanium alcoholate, and complete elimination of the formation of butenes-2, higher olefines and polyethylene.

When the method of the invention is effected in the medium of oxygen-containing solvents, the concentration of the catalyst can be varied within $1\cdot 10^{-6}$ to $1\cdot 10^{-1}$ mole/lit. The molar ratio of the catalyst components can also be varied within a wide range (Al/Ti = 2.0 − 2000). In case of low molar ratios (Al/Ti less than 2.0) dimerization does not take place. When ethylene dimerization is carried out in the medium of heteroatom-containing solvents, as the main component of the catalyst use can be made either of complex titanium alcoholates $(RO)_3TiR'\cdot AlR_2''OR$, or of individual titanium alcoholates $(OR)_4Ti$.

Bringing down the catalyst concentration to $1\cdot 10^{-4}$ − $1\cdot 10^{-5}$ mole/lit., with all other things being equal, allows a sharp increase in the catalyst efficiency (up to 20000 moles of butene-1 per mole of $Ti(OR)_4$).

It has been established that the catalyst in diethyl ether and tetrahydrofuran at temperatures of 20° to 40°C does not lose its activity for a period of 48 hours. At low temperatures (from −40° to +20°C) dimerization of ethylene starts after a long induction period, this period as such being conditioned by the reactions of formation of active centres in the system $Ti(OR)_4$ − $AlR_3'$. When ethylene is dimerized on $(RO)_3\cdot TiR'\cdot AlR_2''OR$ − $AlR_3$ under otherwise equal conditions, the induction period characterized by the absence of the ethylene dimerization reaction either diminishes or disappears.

Within the temperature range of +50° to 100°C the induction period is practically absent and dimerization starts immediately after blending the catalyst components. Best results as to the dimerization rates, the yield of butene-1 and the catalyst selectivity have been obtained when dimerizing ethylene in the medium of diethyl ether, at temperatures ranging from +40° to +80°C, ethylene pressures ranging from 2 to 12 atm and Al/Ti molar ratios from 10 to 50. Under said conditions the rate of dimerization of ethylene to butene-1 with the concentration of Ti(OR)$_4$ being 0.55 mmole/lit. reaches 10 g/lit. per minute, the yield of butene-1 is 2500 g per gram of Ti(OR)$_4$, and by-products, i.e. polyethylene, butenes-2 and higher olefines are absent altogether Similar results have been obtained when using as the reaction medium mixtures of heteroatom-containing organic compounds with hydrocarbons or their chlorine-containing derivatives, such as diethyl ether + butene-1; diethyl ether + n-heptane, diethyl ether + ethyl chloride, tetrahydrofuran + ethyl chloride, etc.

Given hereinbelow is a description of the preferred embodiment of the method of the invention.

Dimerization of ethylene to butene-1 (unless otherwise specified) was carried out in a steel temperature-controlled reactor equipped with a stirrer provided with a screened drive. With the aid of said stirrer the reaction mass was intensively stirred (with a speed of about 1500 r.p.m.). Before the experiments the apparatus was heated to 60°C and air was evacuated from it by means of a vacuum pump to a pressure below $10^{-2}$ mm Hg for 1 hour, after which the apparatus was blown with ethylene. This done, 0.2 lit. of diethyl ether was fed into the reactor, a preset temperature, namely, +40°C, was established in it, and ethylene was fed into the reactor in such an amount as to ensure the required ethylene pressure, namely, 8.0 atm. Then 0.1937 g of alcoholate $(C_4H_9O)_3TiC_2H_5 \cdot Al(C_2H_5)_2OC_4H_9$ and 3.05 g of triethylaluminium (Al/Ti = 49.5) were introduced into the reactor. Dimerization of ethylene to butene- 1, which commenced immediately upon introducing of 3.05 g of triethylaluminium, was carried out under constant pressure, this being attained by continuously feeding ethylene into the reactor from a gas bottle. The process was run for 250 minutes till the reactor was completely filled with butene-1. The reaction of ethylene dimerization to butene-1 was interrupted by adding 20 ml of ethyl alcohol into the reactor. The resultant butene-1 together with the solvent and catalyst were discharged from the reactor through its bottom valve into the still of a rectification column. 445 g of butene-1 were produced. The average rate of dimerization of ethylene to butene-1 was 8.52 g/lit. per minute, the yield was 2330 g of butene-1 per gram of Ti(OC$_4$H$_9$)$_4$, this corresponding to 14150 mole of butene-1 per mole of Ti(OC$_4$H$_9$)$_4$. Chromatographic analysis of the raction products showed absence of polyethylene, butenes-2 and higher olefines.

Other features and advantages of the herein-proposed method of producing butene-1 will become apparent from the following detailed description of specific examples illustrating the embodiment thereof.

EXAMPLE 1

A steel 250 ml capacity reactor equipped with a propeller stirrer (1400 r.p.m.) is charged with 100 ml of heptane, $3.5 \cdot 10^{-4}$ mole of $(C_4H_9O)_3TiC_2H_5 \cdot Al(C_2H_5)_2(OC_4H_9)$, the reactor is heated to 40°C and then filled with ethylene to a pressure of 10 atm, whereupon $5 \cdot 10^{-3}$ mole of Al(C$_2$H$_5$)$_3$ is injected into it.

The dimerization reaction is run for two hours at the above-stated constant pressure of ethylene and then terminated by introducing 10 ml of ethyl alcohol into the reactor. The content of higher olefines is determined chromatographically, the polymer is washed with ethyl alcohol and dried to constant weight.

49.5 g of butene-1, 1.5 g of higher olefines and 1.3 g of the polymer are obtained. The yield of butene-1 is 312 g per gram of the complex titanium alcoholate. The yield of the by-products is 5.3 weight percent.

EXAMPLE 2

By following the procedure outlined in Example 1, dimerization of ethylene to butene-1 is carried out in the medium of n-decane, at a temperature of 20°C, ethylene pressure of 2.7 atm, for a period of 96 min. The resulting product contains 18 g of butene-1. The content of butene-1, higher olefines and polymer in the resulting product is 97.5, 1.9 and 0.6 weight per cent respectively.

EXAMPLE 3

Under the conditions of Example 2, $(C_2H_5O)_3TiC_2H_5 \cdot Al(C_2H_5)_2(OC_2H_5)$ is used as titanium alcoholate. In 120 minutes a product is obtained containing 22 g of butene-1. The content of butene-1, higher olefines and polymer in the product is 96.3, 2.8 and 0.9 weight per cent respectively.

EXAMPLE 4

A glass reactor having a capacity of 50 ml and equipped with a magnetic stirrer is charged with 20 ml of n-heptane, $0.1 \cdot 10^{-3}$ mole of $(C_4H_9O)_3TiC_2H_5 \cdot Al(C_2H_5)_2(OC_4H_9)$, ethylene pressure of 0.55 atm is established in it, and at a temperature of 22°C $0.38 \cdot 10^{-3}$ mole of Al(C$_2$H$_5$)$_3$ is added.

The initial dimerization rate is 45.7 g/lit. per hour.

EXAMPLE 5

Under the conditions of Example 4, Ti(OC$_4$H$_9$)$_4$ is used.

The initial rate of ethylene dimerization is 31.1 g/lit. per hour.

EXAMPLE 6

Under the conditions similar to those described in Example 1 dimerization of ethylene is carried out at a temperature of 20°C, ethylene pressure of 1.7 atm, in the medium of ethyl chloride. As titanium alcoholate use is made of $(C_6H_5CH_2O)_3TiC_2H_5 \cdot Al(C_2H_5)_2 \cdot (OCH_2C_6H_5)$ and Al(iso-C$_4$H$_9$)$_2$H. After a period of 120 minutes a product is obtained containing 12.8 g of butene-1, 0.2 g of higher olefines and 0.3 g of polymer, this corresponding to 96.25, 1.5 and 2.25 weight per cent respectively.

EXAMPLE 7

Under the conditions of Example 6, Ti(OCH$_2$C$_6$H$_5$)$_4$ is used. 8 g of a product are obtained, wherein butene-1 makes 88 weight per cent, higher olefines and polymer, 12 weight percent.

EXAMPLE 8

A steel reactor having a capacity of 250 ml is charged with 89 ml of ethyl chloride, $5 \cdot 10^{-4}$ mole of Ti(OC$_4$H$_9$)$_4$ and $2.5 \cdot 10^{-5}$ mole of (C$_5$H$_5$)$_2$TiCl$_2$.

A pressure of 3 atm is established in the reactor and $5 \cdot 10^{-3}$ mole of Al(C$_2$H$_5$)$_3$ is introduced thereinto at a temperature of 30°C. The reaction is run for 90 min.

and gives 44.2 g of butene-1, and 0.8 g of higher olefines and polymer. The yield of butene-1 is 260 g per gram of $Ti(OC_4H_9)_4$; that of higher olefines and polyethylene is 1.78 weight per cent.

EXAMPLE 9

Under the conditions similar to those of Example 8 the amount of $(C_5H_5)_2TiCl_2$ charged into the reactor is $1.2 \cdot 10^{-4}$ mole. After a period of 90 min. 47 g of butene-1 and 0.9 g of higher olefines and polymer are obtained. The yield of butene-1 is 276 g per gram of $Ti(OC_4H_9)_4$, the yield of the by-products making 1.87 weight per cent.

EXAMPLE 10

Under the conditions of Example 8 the amount of $(C_5H_5)_2TiCl_2$ charged into the reactor is $5 \cdot 10^{-4}$ mole. The reaction lasting for 90 min. gives 32 g of butene-1 and 0.7 g of higher olefines and polymer. The yield of butene-1 is 187 g per gram of $Ti(OC_4H_9)_4$, that of by-products is 2.14 weight percent.

EXAMPLE 11

A steel reactor having a capacity of 250 ml is charged with 100 ml of ethyl chloride and ethylene is fed into the reactor at a temperature of 20°C to a pressure of 3 atm. Then $5 \cdot 10^{-4}$ mole of $Ti(OC_4H_9)_4$, $5 \cdot 10^{-3}$ mole of $Al(C_2H_5)_3$ and $5 \cdot 10^{-3}$ mole of oxygen are introduced into the reactor. The reaction is run for 240 minutes and gives 58 g of butene-1, 0.46 g of higher olefines and 0.53 g of polyethylene. The yield of butene-1 is 342 g per gram of $Ti(OC_4H_9)_4$, and the total yield of by-products is 1.7 weight per cent.

EXAMPLE 12

A reactor similar to that of Example 11 is charged with 100 ml of n-heptane, $2 \cdot 10^{-4}$ mole of $Ti(OC_4H_9)_4$, $2 \cdot 10^{-3}$ mole of $Al(C_2H_5)_3$ and $1 \cdot 10^{-3}$ mole of oxygen. The reaction run for 186 min. gives 20.4 g of butene-1, 0.35 g of higher olefines and 0.42 g of polymer. The yield of butene-1 is 234 g per gram of $Ti(OC_4H_9)_4$, and the total yield of by-products is 3.7 weight per cent.

EXAMPLE 13

A reactor similar to that of Example 11 is charged with 100 ml of toluene, $5 \cdot 10^{-4}$ mole of $Ti(OC_4H_9)_4$, $5 \cdot 10^{-3}$ mole of $Al(C_2H_5)_3$ and $10 \cdot 10^{-3}$ mole of oxygen. The result is 21 g of butene-1 and 2.9 weight per cent of by-products.

EXAMPLE 14

The conditions are the same as in Example 11, except that the amount of oxygen charged into the reactor is $1.0 \cdot 10^{-3}$ mole and the ethylene pressure established is 6.9 atm. The reaction run for 100 min. gives 31 g of butene-1. The content of higher olefines and polyethylene in the reaction products is 1.5 weight percent.

EXAMPLE 15

Under the conditions of Example 13 no oxygen is added into the reactor. The reaction time is 240 min., with the result of 33.4 g of butene-1 and 1,25 g of higher olefines and polyethylene. The yield of butene-1 is 197 g per gram of $Ti(OC_4H_9)_4$, or 96.4 weight per cent.

EXAMPLE 16

A steel reactor of a 400 ml capacity is charged with 100 ml of n-heptane, 0.27 g of metaphenylenediamine, $5 \cdot 10^{-4}$ mole of $Ti(OC_4H_9)_4$ and $5 \cdot 10^{-3}$ mole of $Al(C_2H_5)_3$. The molar ratio of $Al(C_2H_5)_3$ to metaphenylenediamine is 2:1. At a pressure of ethylene of 3 atm and at a temperature of 20°C, during a period of 280 min. 44 g of butene-1 and 0.6 g of higher olefines are obtained. No polymer is detected in the reaction products. The yield of butene-1 is 260 g per gram of $Ti(OC_4H_9)_4$, or 98.55 weight per cent.

EXAMPLE 17

Under the conditions of Example 16 the molar ratio of $Al(C_2H_5)_3$ to metaphenylenediamine is 1:1. During 90 min. 7 g of butene-1 and 0.1 g of higher olefines are obtained. Polyethylene is not detected in the reaction products.

EXAMPLE 18

Under the conditions of Example 16, the molar ratio of $Al(C_2H_5)_3$ to metaphenylenediamine is 10:1. During 90 min. the reaction gives 9.5 g of butene-1, 0.18 g of higher olefines and traces of polymer.

EXAMPLE 19

Under the conditions of Example 16, 0.525 g of N-phenyl-$\beta$-naphthylamine is employed. During 90 min. 17 g of butene-1 and 0.22 g of higher olefines are obtained. Polymer is absent.

EXAMPLE 20

Under the conditions of Example 17, use is made of diisopropylamine. The result is 16.8 g of butene-1, 0.25 g of higher olefines, and traces of polymer.

EXAMPLE 21

Under the conditions of Example 17, diethylamine is employed. 16.3 g of butene-1, 0.2 g of higher olefines, and traces of polymer are obtained.

EXAMPLE 22

Under the conditions of Example 17, $1 \cdot 10^{-3}$ mole of triethylamine is employed. With the molar ratio of $Al(C_2H_5)_3$ to $N(C_2H_5)_3$ equal to 5.1, 11 g of butene-1, 0.1 g of higher olefines, and 0.06 g of polymer are obtained.

EXAMPLE 23

A steel reactor having a capacity of 250 ml is charged with 84 ml of ethyl chloride, 16 ml of heptane, $5 \cdot 10^{-4}$ mole of $Ti(OC_4H_9)_3C_2H_5 \cdot Al(C_2H_5)_2(OC_4H_9)$ and $9 \cdot 10^{-3}$ mole of $Al(C_2H_5)_3$. At a constant pressure of ethylene maintained at 5.7 atm and at a temperature of 20°C 23 g of butene-1 and 0.1 g of solid polyethylene are obtained during 97 min. Content of butane in the gaseous phase is about 1 per cent.

EXAMPLE 24

Under the conditions of Example 23 toluene is used as the solvent and ethylene pressure is 6.9 atm. During 96 min. 17.5 g of butene-1 and 0.3 g of polyethylene are obtained. The content of butene-1 in the gas mixture is 97 percent, that of butane and higher olefines, 3 per cent.

EXAMPLE 25

A steel reactor having a capacity of 250 ml is charged with 87.5 ml of ethyl chloride, $5 \cdot 10^{-4}$ mole of Ti$(OC_4H_9)_4$, $5 \cdot 10^{-4}$ mole of Al$(C_2H_5)_3$. At ethylene pressure of 6.9 atm 23 g of butene-1 are obtained during 97 min. The content of butene-1 in the gas mixture is 98.5 per cent, that of butane and higher olefines, 1.5 per cent.

EXAMPLE 26

A steel reactor having a capacity of 250 ml is charged with 90 ml of ethyl chloride, 10 ml of n-heptane, $5 \cdot 10^{-4}$ mole of Ti(iso-$C_3H_7O)_4$, $5 \cdot 10^{-3}$ mole of Al$(C_2H_5)_3$. At 20°C and ethylene pressure of 2.7 atm during 70 min. 4.55 g of butene-1 are obtained, this corresponding to 98.5 weight percent.

EXAMPLE 27

A steel reactor having a capacity of 1000 ml is charged with 200 ml of diethyl ether, 0.6 g of Ti$(OC_4H_9)_4$ and 0.2 g of Al$(C_2H_5)_3$. 30 minutes later another 1.8 g of Al$(C_2H_5)_3$ is added into the reactor. The ethylene pressure established in the reactor is 8.0 atm. At 40°C during 4 hours 151 g of butene-1 are obtained. The average dimerization rate is 5.25 g/lit. per minute, or 385 moles of butene-1 per mole of Ti$(OC_4H_9)_4$ per hour. With the experiment being continued after 16 hours, another 175 g of butene-1 are obtained during 110 minutes under the same conditions, with the dimerization rate 7.9 g/lit. per minute. The total yield of butene-1 is 547 g per gram of Ti$(OC_4H_9)_4$, which makes 3320 moles of butene-1 per mole of Ti$(OC_4H_9)_4$. Butenes-2, higher olefines and polyethylene are not detected in the reaction products.

EXAMPLE 28

A steel reactor having a capacity of 1000 ml is charged with 220 ml of diethyl ether, 0.375 g of tetrabutoxytitanium and 1.245 g of triethylaluminium (Al/Ti = 10.0). At a temperature of +60°C and ethylene pressure of 8.0 atm, during 6.5 hours 545 g of butene-1 are obtained. The yield of butene-1 is 1500 g per gram of Ti$(OC_4H_9)_4$, this corresponding to 8850 moles of butene-1 per mole of Ti$(OC_4H_9)_4$. Cis- and transbutenes-2, higher olefines and polyethylene are absent in the reaction products.

EXAMPLE 29

A steel reactor is charged with 200 ml of diethyl ether, 0.1875 g of tetrabutoxytitanium and triethylaluminium in two portions (0.2 g + 2.26 g) with an interval of 30 minutes (Al/Ti = 39.2). At 60°C and ethylene pressure of 16.0 atm 364 g of butene-1 are obtained during 314 minutes (the reaction having been stopped 4 hours after the commencement and then the experiment continued with an interval of 16 hours). The average dimerization rate is 5.8 g/lit. per minute, the yield is 11800 moles of butene-1 per mole of Ti$(OC_4H_9)_4$, or 1940 g of butene-1 per gram of Ti$(OC_4H_9)_4$. No by-products are detected.

EXAMPLE 30

A reactor is charged with 200 ml of diethyl ether, 0.1875 g of Ti$(OC_4H_9)_4$ and 3.11 g of triethylaluminium (Al/Ti = 49.6). At 40°C and ethylene pressure of 8.0 atm, during 250 minutes 435 g of butene-1 are obtained. The average dimerization rate is 8.5 g/lit. per minute, the yield is 2320 g per gram of Ti$(OC_4H_9)_4$, which corresponds to 14100 moles of butene-1 per mole of Ti$(OC_4H_9)_4$. The process selectivity is 100 percent.

EXAMPLE 31

A reactor is charged with 200 ml of vinylbutyl ether, 5.2 g of tetrabutoxytitanium and 17.2 g of Al$(C_2H_5)_3$. During 6 hours at a temperature of 60°C and ethylene pressure of 12 atm 40 g of butene-1 are obtained.

EXAMPLE 32

A reactor is charged with 200 ml of tetrahydrofuran, 0.36 g of tetrabutoxytitanium and 5 g of triethylaluminium. At a temperature of 60°C and ethylene pressure of 12 atm 32 g of butene-1 are obtained during 10 hours.

EXAMPLE 33

A reactor is charged with 50 ml of butene-1, 40 ml of diethyl ether, 0.17 g of tetrabutoxytitanium and 0.57 g of triethylaluminium. At a temperature of 60°C and ethylene pressure of 8.0 atm 95 g of butene-1 are obtained during 6.5 hours. After 16 hours the experiment is continued at a pressure of 16 atm. During 1 hour at a temperature of 60°C another 25 g of butene-1 are obtained. Cis-, trans-butenes-2, oligomers of ethylene and polyethylene are not detected in the reaction products. The yield of butane-1 is 900 g per gram of Ti$(OC_4H_9)_4$.

EXAMPLE 34

A reactor is charged with 50 ml of diethyl ether, 50 ml of ethyl chloride, 0.17 g of tetrabutoxytitanium and 1.14 g of triethylaluminium. At a temperature of 60°C and ethylene pressure of 8.0 atm 6.0 g of butene-1 are obtained during 60 minutes. Selectivity is 100 percent.

EXAMPLE 35

A reactor is charged with 200 ml of diethyl ether, 0.204 g of tetrabutoxytitanium and 10 g of diisobutylaluminium hydride. At a temperature of 60°C and ethylene pressure of 7.3 atm 141 g of butene-1 are obtained during 109 minutes. Cis-, trans-butenes-2, ethylene oligomers and polyethylene are not detected in the reaction products.

EXAMPLE 36

A reactor is charged with 200 ml of diphenyl ether, 0.5 g of tetrabutoxytitanium, and 3.2 g of triethylaluminium (Al/Ti = 20). At a temperature of +60°C and ethylene pressure of 5.0 atm 150 g of butene-1 are obtained during 52.5 minutes. The yield is 300 g of butene-1 per gram of tetrabutoxytitanium, or 1910 moles of butene-1 per mole of Ti$(OC_4H_9)_4$. Selectivity is 100 percent.

EXAMPLE 37

A reactor is charged with 200 ml of methylphenyl ether (anisole), 0.1875 g of tetrabutoxytitanium and 2.55 g of triethylaluminium (Al/Ti =40). At a temperature of 40°C and ethylene pressure of 8.0 atm 307.5 g of butene-1 are obtained during 240 minutes. The yield of butene-1 is 1640 g per gram of Ti$(OC_4H_9)_4$. Selectivity is 100 percent.

What is claimed is:

1. A method of producing butene-1, residing in that ethylene is dimerized to butene-1 in the presence of a complex organometallic catalyst consisting of titanium alcoholates of the formula $(RO)_3TiR' \cdot AlR_2''OR$ and alkylaluminum of the formula $AlR_2''R'$, where R is an alkyl radical with the number of carbon atoms from 2 to 4, $R' = R$ or H, $R''$ is the same as R, in the medium of hydrocarbon solvents selected from the group consisting of n-heptane, n-decane and toluene.

* * * * *